May 2, 1961

C. A. BORCHER 2,982,209

DEMOLITION FIRING DEVICE

Filed June 27, 1947

Inventor
CHARLES A. BORCHER

By M. A. Hayes

Attorney

May 2, 1961
C. A. BORCHER
2,982,209
DEMOLITION FIRING DEVICE
Filed June 27, 1947
3 Sheets-Sheet 2
Fig. 2.
Fig. 3.
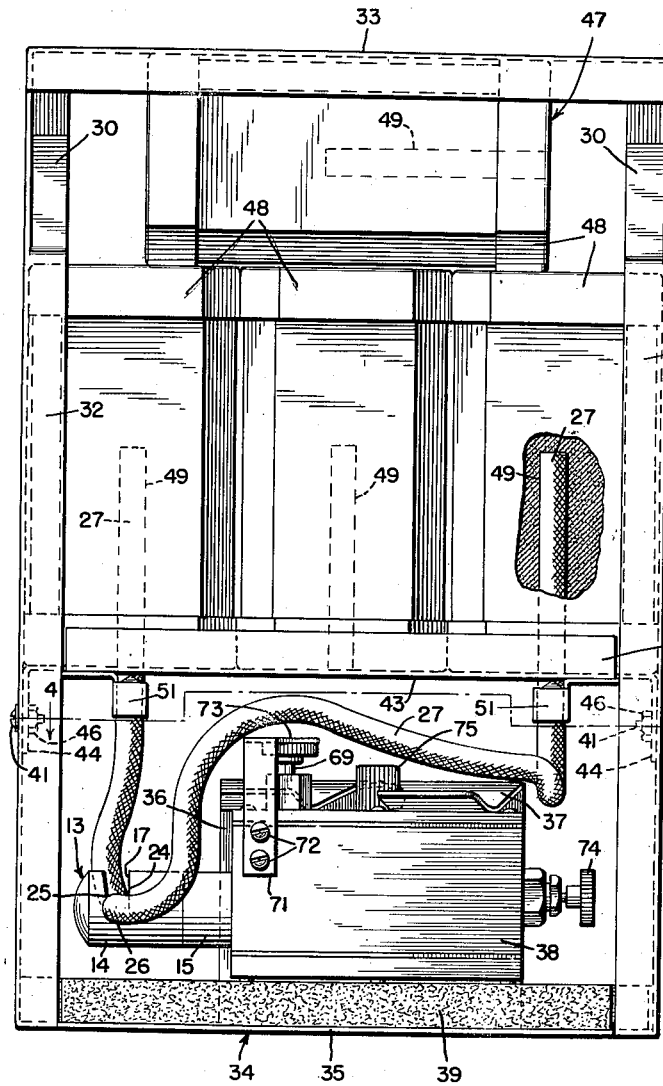
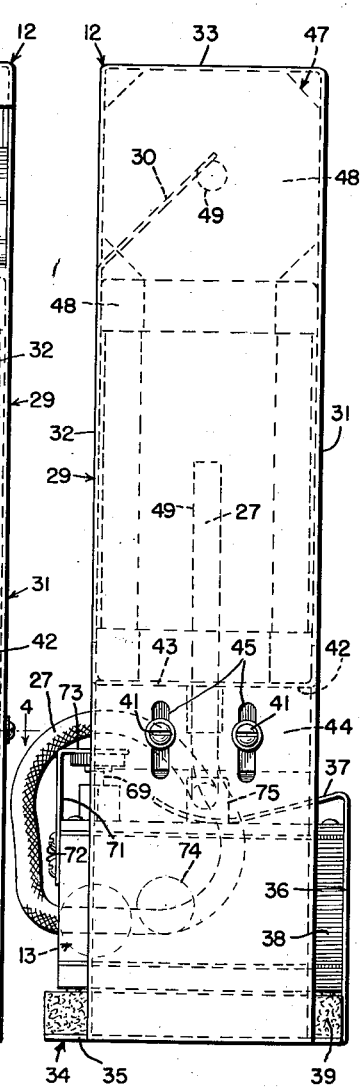
Inventor
CHARLES A. BORCHER
By M. O. Hayes
Attorney May 2, 1961 C. A. BORCHER 2,982,209
DEMOLITION FIRING DEVICE
Filed June 27, 1947 3 Sheets-Sheet 3

Inventor
CHARLES A. BORCHER
By M. O. Hayes
Attorney

2,982,209

DEMOLITION FIRING DEVICE

Charles A. Borcher, 304 Franklin Ave., Silver Spring, Md.

Filed June 27, 1947, Ser. No. 757,783

5 Claims. (Cl. 102—22)

(Granted under Title 35, U.S. Code (1952), sec. 266)

This invention relates to a demolition device and is particularly employed for destroying secret electronic equipment used by our armed forces for deceiving the enemy, the equipment comprising a casing enclosing the demolition device adapted to be dropped from an aircraft in flight in proximate relation with respect to the enemy such that deceptive information released therefrom may be clearly audible to the enemy.

Such electronic equipment is employed for releasing audible sounds such, for example, as sounds resembling military operations and the like, in a realistic manner thereby to deceive and distract the enemy such that the attention and gunfire of the enemy will be concentrated far remote from the actual military operations being conducted by our armed forces thus permitting a surprise attack or military operation by our armed forces to be executed substantially unnoticed and unchallenged by the enemy until such operations or attacks are well under way. The device of the present invention is adapted to be arranged within the casing containing electronic equipment in such a manner as to demolish completely the aforesaid equipment when fired after the equipment has served its purpose, the firing of the demolition device being controlled by a clock mechanism arranged in the demolition device and settable at will to different settings such that the delay period may be varied from 15 minutes to 12 hours before the demolition charge is fired.

One of the objects of the invention is the provision of a new and improved demolition unit detachably arranged within a casing containing secret electronic equipment in such a manner as to demolish completely the equipment when the unit is fired.

Another object of the invention is the provision of a demolition unit in which means are provided for quickly attaching an explosive cord thereto, the cord being adapted to fire a plurality of demolition charges after a time delay device has been set in operation and when a predetermined period of time controlled by the device has elapsed.

Another object of the invention is the provision of a demolition unit for destroying a sound reproducing device adapted to be dropped from an aircraft in flight upon the ground in audible range with respect to the enemy for releasing deceptive and false sounds thereto, and in which means are provided for demolishing completely the reproducing device in predetermined time delayed relation with respect to the release of the device from the aircraft whereby it will explode while the equipment is on the ground after it has served its purpose.

A further object of the invention is to provide a new and improved demolition unit for firing a plurality of demolition charges included therein in predetermined time delayed relation with respect to the starting of a clock mechanism arranged therein and in which the charges are fired when the time delay period has elapsed.

A still further object is to provide a new and improved demolition device which is economical to manufacture, reliable in operation, and which possesses the qualities of durability during handling, transportation and when in use.

Still further objects, novel features and advantages of the invention will become apparent from the following description, taken in connection with the accompanying drawings, wherein:

Fig. 2 is an elevational view of the demolition unit of the present invention;

Fig. 3 is a side elevational view of the device of Fig. 2;

Figure 1:
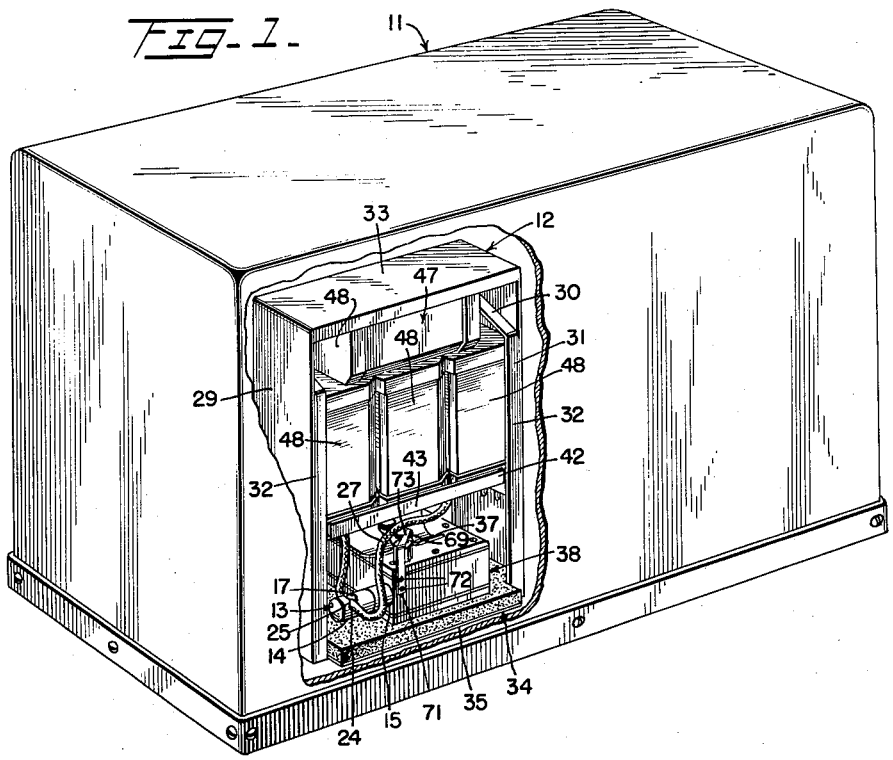
Fig. 1 is a perspective view of a casing partly broken away and enclosing an electronic device and the demolition unit of the present invention.
Figure 4:
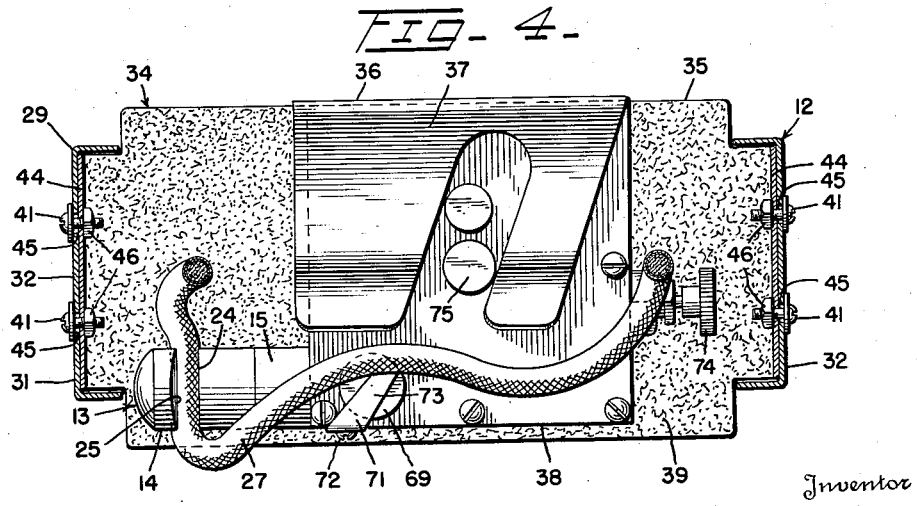
Fig. 4 is a sectional view taken on the line 4—4 of Fig. 2.

Referring to the drawings in detail for a more complete understanding of the invention and particularly to Fig. 1 thereof, there is shown an electronic sound reproducing device comprising a casing 11 having the demolition unit 12 of the present invention arranged therein for destroying the aforesaid device completely when the unit is fired.

Figure 5:
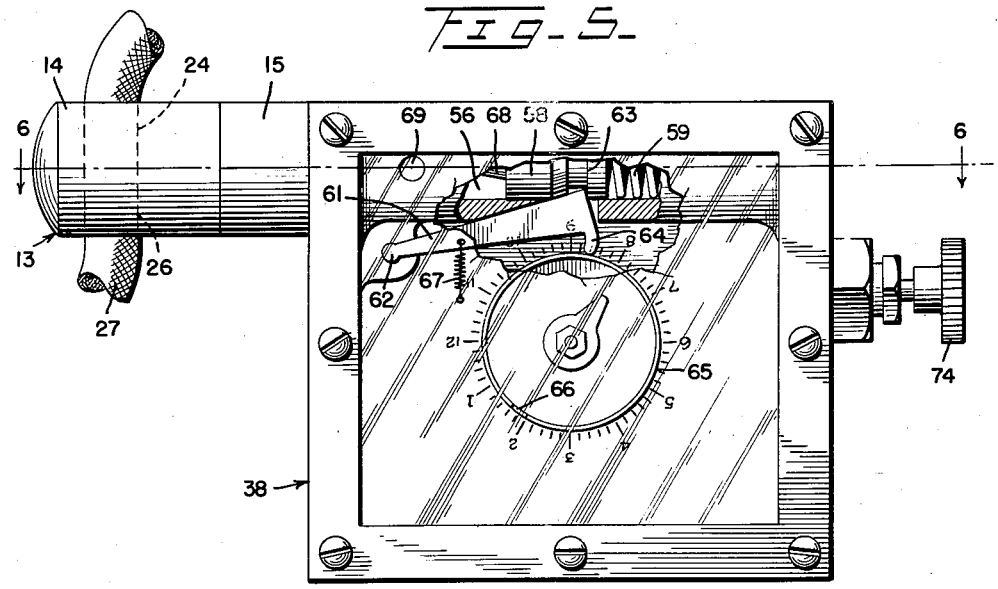
Fig. 5 is an enlarged elevational view of the exploder employed with the present invention shown in connection with a clock actuating and firing mechanism therefor.

The demolition unit comprises an exploder generally indicated by the reference character 13, having an exploder head 14 composed of any material suitable for the purpose such, for example, as cold rolled steel and a holder 15 having threaded engagement with an internally threaded bore formed in one end of the exploder. As shown on Fig. 5 the holder is threaded into the exploder a predetermined amount thus providing a chamber 16 therein, the chamber being disposed between one end portion of the holder and a relatively thin wall 17 formed on the exploder.

Arranged within the chamber 16 in abutting engagement with respect to one end portion of the holder 15 and the wall 17 is an explosive charge 18 such, for example, as a tetryl pellet. The holder has formed therein a centrally disposed bore extending therethrough and comprising a reduced portion 19 and an enlarged portion 21. Disposed within the portion 19 of the bore is a detonator 22 having one end thereof in abutting engagement with the tetryl pellet 18, the other end thereof being spaced a predetermined distance from one end of a sensitive primer 23 arranged in the enlarged portion 21 of the bore. By the aforesaid arrangement an explosive train is provided from the primer 23 to the tetryl pellet 18.

Figure 6:
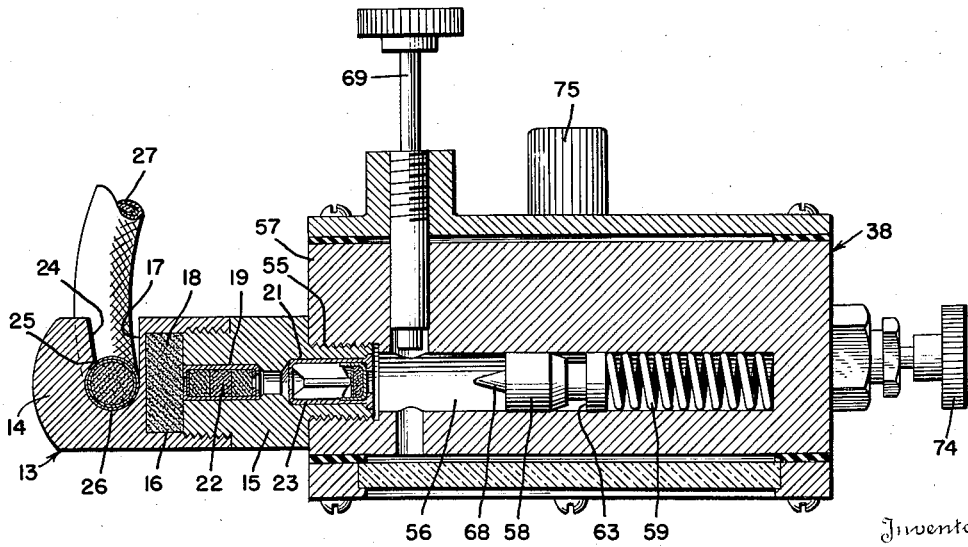
Fig. 6 is an enlarged detail sectional view taken substantially on the line 6—6 of Fig. 5.

As shown most clearly on Fig. 6 of the drawings the exploder 13 has arranged therein a slot 24 having a restricted portion 25 which terminates in a substantially circular portion 26 adapted to receive and support a "Primacord" or explosive cord 27, the cord being detachably supported within the circular portion 26 of the slot adjacent the pallet 18. By the aforesaid arrangement the "Primacord" is compressed or distorted as the cord is inserted into the portion 25 of the slot. When the cord has been forced through the slot and into the circular portion 26 thereof it will assume its original form thus preventing the cord from being readily withdrawn therefrom and also disposing the cord in the most advantageous position with respect to the explosive charge 18 such that the full force of the explosion as the charge is fired will be concentrated on the cord thereby to cause detonation thereof.

A rack generally indicated by the reference character 29 and composed of any material suitable for the purpose such, for example, as galvanized sheet steel is arranged within the casing 11 enclosing the secret equipment to be destroyed. The rack comprises a U-shaped channel frame 31 having a pair of depending side members 32 connected together at one end thereof by an end member 33 integrally formed therewith, the other end of the members 32 being connected by a support 34 secured thereto in any suitable manner preferably as by soldering the parts together.

The support 34 comprises a transverse base portion 35 having integrally formed thereon a vertical portion 36 bent at a right angle with respect to the portion 35 on which is formed a clamp 37 disposed between the side members 32 and arranged in substantially the same plane as the portion 35 and spaced therefrom. The member 37 is arranged in clamping engagement with a clock generally indicated by the reference character 38, the clock being disposed between the clamp and a felt pad 39 arranged on the portion 35 of the support 34 thus maintaining the clock in a fixed position within the U-shaped frame 31.

Secured to the side members 32 as by a pair of bolts 41 is a support 42, comprising a shelf 43 having a flange 44 formed on each end thereof and in abutting engagement respectively with the side members, each bolt being disposed in openings formed in the flanges 44 and extending through slots 45 formed in the side member 32 and thus the support 42 is maintained in an adjusted position on the side members when the nuts 46 are tightened on the bolts.

Clamped within the channel frame 31 by the support 42 is a battery of explosive charges generally indicated by the reference character 47 and comprising a plurality of blocks 48 composed of any type of explosive material suitable for the purpose such, for example, as the type known to those skilled in the art as T.N.T. tetryl, each block being provided with a centrally disposed bore 49. As shown on Fig. 2 the free ends of the "Primacord" 27 are respectively arranged within the bores 49 formed in the outermost blocks 48 comprising the battery to cause explosion of the entire battery as the "Primacord" is detonated by the exploder 13 thus demolishing completely the aforesaid secret equipment within the casing 11. The free ends of the cords 27 are maintained within their respective bores 49 by a pair of spring clips 51 frictionally engaging the cords and secured in any suitable manner to the shelf 43 and in alignment with the aforesaid bores formed in the two outermost blocks.

As shown on Figs. 2 and 3 a portion of each side member 32 is split longitudinal and bent inwardly as at 30, thereby to prevent transverse shifting of the uppermost block 48 in either direction between the side members 32 sufficiently to become disengaged from abutting engagement with the two outermost blocks, thus the outermost blocks are locked within the channel frame by the uppermost block and longitudinal movement thereof is prevented should the uppermost block be shifted in either direction into engagement with portion 30 in response to a sudden shock during handling and transportation.

The exploder is secured to the clock 38 in any suitable manner preferably by a nipple 55 formed on the holder 15 and having threaded engagement with a bore 56 arranged in the clock casing 57 Fig. 6.

Slideably and releasably arranged within the bore 56 disposed in the clock casing is a firing pin 58 adapted to be urged to a firing position by a spring 59 when released, the release thereof being controlled by the clock mechanism and a lever 61 operatively connected thereto. The latch member 61 is pivoted at one end to the clock casing as at 62, the other end thereof being in abutting engagement with a shoulder 63 formed on the firing pin 58. The latch member is also provided with a tongue 64 integrally formed thereon and adapted to engage and ride on an annular member 65 rotatably supported on the rotatable shaft of the clock.

The firing pin is maintained in a locked position by the lever 61 until the annular member has been rotated a predetermined amount by the clock mechanism. When this occurs the tongue 64 on the latch member 61 will be urged into a slot 66 formed in the annular member 65 whereupon the lever will be moved out of engagement with shoulder 63 and release the firing pin, the movement of the lever 61 being controlled by a spring 67 having one end thereof secured to the lever and the other end anchored to the clock casing, Fig. 5.

When the firing pin 58 has been released, the spring 59 will urge the firing pin into firing position, the striker 68 formed thereon being driven into firing engagement with the primer 23 with sufficient force to cause firing thereof. The primer fires the detonator 22 and the force of the explosion therefrom is sufficient to fire the tetryl pellet 18, and concurrently therewith and initiated thereby, the "Primacord" 27 is fired, which, in turn, fires the tetryl blocks 47, the force of the explosion of the aforesaid blocks being sufficient to completely demolish the secret electronic equipment.

The clock employs the usual safety pin 69 arranged in alignment with the firing pin 58 and spaced therefrom, thus preventing the firing pin from engaging the primer 23 should the firing pin be released prematurely. Displacement of the safety pin is prevented by a spring clip 71 secured to the clock casing as at 72 and having a finger 73 formed thereon adapted to be normally in engagement with the safety pin, it being understood, however, that the finger 73 is moved out of engagement with respect to the firing pin when the clock mechanism is set in motion thus permitting the firing pin to be urged into firing engagement with the primer 23 as the firing pin is released by the latch member 61 when a predetermined period of time has elapsed after the clock mechanism has been set in operation. The clock mechanism is released and set into operation by a stem 74, and, if desired, the mechanism may be stopped by the stem in the event that a shorter time delay period is required after the clock has again been set in operation by the stem 74, the initial setting thereof being controlled by a stem 75.

The clock may be a conventional type of clock as heretofore employed by the armed forces for demolition purposes whereby a demolition charge is fired when a predetermined period of time has elapsed after the clock mechanism has been set in operation.

The operation of the device will now be described. Let it be assumed, by way of example, that the casing 11 containing the electronic device and the demolition unit is about to be dropped from an aircraft in flight, the annular member 65 is rotated to the desired setting with respect to tongue 64 on member 61 by stem 75 to control the time delay period and the clock mechanism is released and set in motion by stem 74. The electronic device is now dropped from the aircraft, the flight thereof toward the ground being preferably retarded by a parachute attached thereto in any suitable manner thus preventing damage or injury to the aforesaid device and unit as the casing 11 strikes the ground. It will be understood, however, that when the clock is set in operation the annular member 65 operatively connected thereto starts to rotate and rotation thereof will continue until the slot 66 formed in the annular member is brought in alignment with the tongue 64 formed on member 61. When this occurs the tongue will be urged into the slot 66 by spring 67 whereupon the member is moved out of engagement with shoulder 63 arranged on the firing pin 58, thereby releasing the firing pin for sliding movement, the firing pin is urged into firing position by spring 59 and the striker 68 formed thereon is driven into the primer 23 with sufficient force to cause firing thereof. The detonator 22 is fired by the primer, the force of the explosion therefrom being sufficient to fire the tetryl pellet 18, and concurrently therewith and initiated thereby, the "Primacord" 27 is fired, which in turn fires the tetryl blocks 47, the force of the explosion being sufficient to demolish completely the aforesaid electronic equipment.

From the foregoing description it will be understood that a demolition unit comprising a plurality of explosive charges is arranged within a casing containing electronic sound producing equipment or the like whereby the equipment is demolished completely when the charges are fired after the sound producing equipment has served its purpose, the firing of the charges being controlled by a clock mechanism settable at will to different settings such that the delay period may be varied over a wide range such, for example, as from 15 minutes to 12 hours before the charges are fired.

The many advantages of the demolition unit constructed in accordance with the present invention will be readily apparent from the foregoing description and, although a preferred embodiment of the device is illustrated and described, it is to be understood that changes in the details of construction and in the combination and arrangement of parts may be resorted to which fall within the scope of the invention as claimed.

The invention herein described and claimed may be manufactured and used by or for the Government of the United States of America for governmental purposes without payment of any royalties thereon or therefor.

What is claimed as new and desired to be secured by Letters Patent of the United States is:

1. A demolition unit comprising a frame, a plurality of demolition charges arranged within said frame, means for supporting said charges within said frame, a normally inactive clock mechanism including a casing arranged within the frame, said clock mechanism being settable at will selectively to different settings respectively corresponding to different periods of time, means for setting the clock mechanism to any of said settings, a spring urged firing pin having an annular groove formed therein and a shoulder bordering on said groove and releasably locked within said casing and adapted to be moved to a firing position when released, a spring urged latch member pivotally secured to said casing and normally disposed in said groove in abutting engagement with said shoulder for releasably locking said firing pin within said casing and adapted to release the firing pin when moved sufficiently to be disengaged from said shoulder, means controlled by the clock mechanism in engagement with said latch member for maintaining the latch member in engagement with said shoulder and adapted to provide for said movement thereof when a predetermined period of time has elapsed after the clock mechanism has been set in motion, means for setting the clock mechanism in motion, a percussion exploder secured to said casing and having a thin wall bordering on a keyhole slot, an explosive cord disposed within said slot and locked to said exploder in engagement with said thin wall, said explosive cord having the free ends thereof operatively connected to a pair of said charges, and means including an explosive charge arranged within said exploder in engagement with said thin wall for driving said wall into engagement with said explosive cord with sufficient force to detonate said cord thereby to fire said demolition charges, said last named means being adapted to be fired by the firing pin as the firing pin is moved to said firing position.

2. A demolition unit comprising a frame, a plurality of demolition charges arranged within said frame in abutting relation with respect to one another, means for supporting said charges within said frame, a casing having a clock mechanism arranged therein, said clock mechanism being settable at will selectively to different settings respectively corresponding to different periods of time, means for setting the clock mechanism to any of said settings, a spring urged firing pin having an annular groove formed therein and a shoulder bordering on said groove and releasably locked within said casing and adapted to be moved to a firing position when released, a spring urged member pivotally secured to said casing and normally disposed in said groove in abutting engagement with said shoulder for releasably locking the firing pin within the casing and adapted to release the firing pin when moved sufficiently to be disengaged from said shoulder, means controlled by the clock mechanism in engagement with said pivoted member for maintaining the pivoted member in engagement with said shoulder and adapted to provide for said movement thereof when a predetermined period of time has elapsed after the clock mechanism has been set in motion, a percussion exploder secured to said casing in alignment with the firing pin and having a thin wall bordering on a keyhole slot, an explosive cord disposed within said slot and locked to said exploder in engagement with said thin wall, said cord having the free ends thereof operatively connected to a pair of said charges, a percussion cap arranged within the exploder and adapted to be fired by the firing pin as the pin is moved to said firing position, and means including an explosive charge arranged within said exploder in engagement with said thin wall and fired by said percussion cap for driving said wall into engagement with said explosive cord with sufficient force to detonate said explosive cord.

3. A demolition unit comprising a frame, a plurality of demolition charges arranged within said frame, means adjustably secured to the frame for maintaining said charges therein, a casing having a normally inactive clock mechanism arranged therein, said clock mechanism being settable at will selectively to different settings respectively corresponding to different periods of time, means for setting the clock to any of said settings, a firing pin having an annular groove formed therein and a shoulder bordering on said groove and releasably locked within said casing and adapted to be urged to a firing position when released, a spring urged latch member pivotally secured to said casing and normally disposed in said groove in abutting engagement with said shoulder for releasably locking said pin and adapted to release the pin as the latch member is moved sufficiently to be disengaged from said shoulder, means including a complementnary slotted annular member in engagement with said latch member and operatively connected to said clock mechanism and rotatably supported thereby for maintaining the latch member in engagement with said shoulder and for receiving the latch member into the slot thereof to release said firing pin when said annular member has been rotated from a selected setting to a predetermined release position, means for urging the firing pin to said firing position, a percussion exploder secured to said casing in alignment with the firing pin and having a thin wall bordering on a key hole slot, an explosive cord disposed within said slot and locked to said exploder in engagement with said wall, said cord having the free ends thereof operatively connected to a pair of said charges, a percussion cap arranged within the exploder and adapted to be fired by the firing pin as the pin is urged to said firing position, a detonator arranged within said exploder and adapted to be fired by said percussion cap, and explosive means arranged within said exploder in engagement with said wall and fired by said detonator for driving said wall into engagement with the cord with sufficient force to detonate said explosive cord thereby to fire the demolition charges.

4. In a demolition unit of the class described, in combination, a frame, a plurality of demolition charges arranged within said frame, means adjustably secured to said frame for maintaining said charges within said frame, a normally inactive clock mechanism including a casing arranged within the frame, said clock mechanism being settable at will selectively to different settings respectively corresponding to different periods of time, means for setting the mechanism to any of said settings, a spring urged firing pin having an annular groove formed therein and a shoulder bordering on said groove and releasably locked within said casing and adapted to be moved to a firing position when released, a spring urged latch member pivotally secured to said casing and disposed in said groove in abutting engagement with said shoulder or flocking said firing pin and adapted to release the pin as the latch member is moved sufficiently to be disengaged from said shoulder, means including an annular member in engagement with said latch member and controlled by said clock mechanism for maintaining the latch member in engagement with said shoulder and adapted to provide for said movement thereof when a predetermined period of time corresponding to a selected setting has elapsed after the clock mechanism has been set in operation, means operatively connected to said clock mechanism for setting the mechanism in operation, a percussion exploder secured to said casing in alignment with said firing pin and having a key hole slot therein, explosive means arranged within said exploder and adapted to be fired by the firing pin as the pin is moved to a firing position, and explosive cord disposed within said slot and locked to said exploder in operative relation to said explosive means and having the free ends thereof operatively connected to a pair of said charges for firing said charges as the cord is detonated, anvil means bordering on said slot in engagement with said explosive cord for detonating said cord as the cord is forcibly driven into engagement with said anvil means, and a thin wall on said exploder bordering on said slot in engagement with the explosive means and said cord for forcibly driving the cord into engagement with said anvil means as the explosive means is fired by the firing pin.

5. A unitary demolition device comprising frame, an adjustable partition arranged within said frame forming two chambers therein, a plurality of bolts carried by said partition and disposed within corresponding slots arranged in said frame for adjusting said partition within said frame, a plurality of demolition charges arranged within said frame in one of the chambers and supported by said partition, flange means on said frame and partition in engagement with said charges for maintaining the charges within said frame, a casing disposed within the other chamber and clamped to said frame, a spring carried by said frame in engagement with said casing for clamping the casing to said frame, a clock mechanism arranged with the casing, actuating means carried by said casing and operatively connected to said clock mechanism for setting the mechanism in motion, a spring actuated firing pin releasably locked to said casing and movable to a firing position when released, means operatively connected to the clock mechanism and controlled thereby for releasing the firing pin when a predetermined period of time has elapsed after the mechanism has been set in motion, a percussion exploder secured to said casing in alignment with the firing pin and having a thin wall bordering on a key hole slot, an explosive cord disposed within said slot and locked to said exploder in engagement with said thin wall, said explosive cord having the free end thereof connected to a pair of said demolition charges, a percussion cap in said exploder and fired by said firing pin as the pin is released, a detonator arranged within the exploder and fired by said percussion cap, and explosive means disposed within said exploder in engagement with said thin wall and fired by said detonator for driving said thin wall into engagement with the explosive cord with sufficient force to detonate said cord thereby to fire said demolition charges.

References Cited in the file of this patent

UNITED STATES PATENTS

| | | |
|---|---|---|
| 44,630 | Hughes | Oct. 11, 1864 |
| 898,848 | Dodson | Sept. 15, 1908 |
| 1,558,260 | Glass | Oct. 20, 1925 |
| 1,572,436 | King | Feb. 9, 1926 |
| 2,076,613 | Bleecker | Apr. 13, 1937 |
| 2,397,066 | Whitney | Mar. 19, 1946 |
| 2,485,949 | Wilson | Oct. 25, 1949 |
| 2,514,499 | Kharasch | July 11, 1950 |